United States Patent
Taig et al.

(10) Patent No.: US 10,474,523 B1
(45) Date of Patent: Nov. 12, 2019

(54) AUTOMATED AGENT FOR THE CAUSAL MAPPING OF COMPLEX ENVIRONMENTS

(71) Applicant: EMC IP Holding Company LLC, Hopkinton, MA (US)

(72) Inventors: Ran Taig, Beer Sheva (IL); Amihai Savir, Sansana (IL); Avitan Gefen, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 112 days.

(21) Appl. No.: 15/796,010

(22) Filed: Oct. 27, 2017

(51) Int. Cl.
*G06F 11/07* (2006.01)

(52) U.S. Cl.
CPC .................... *G06F 11/079* (2013.01)

(58) Field of Classification Search
CPC . G06F 11/079; G06F 11/3409; G06F 11/3452
See application file for complete search history.

(56) References Cited

U.S. PATENT DOCUMENTS

| 7,281,170 | B2 * | 10/2007 | Taylor | G06F 11/0709 |
| | | | | 714/48 |
| 8,140,898 | B2 * | 3/2012 | Beg | G06F 11/079 |
| | | | | 714/25 |
| 9,665,420 | B2 * | 5/2017 | Jilani | G06F 11/079 |
| 9,753,801 | B2 * | 9/2017 | Ishii | G06F 11/0754 |
| 2009/0055684 | A1 * | 2/2009 | Jamjoom | G06F 11/0709 |
| | | | | 714/26 |
| 2017/0228277 | A1 * | 8/2017 | Cheng | G06F 11/0709 |
| 2017/0308424 | A1 * | 10/2017 | Gossler | G06F 11/3608 |

* cited by examiner

*Primary Examiner* — Joseph R Kudirka
(74) *Attorney, Agent, or Firm* — Chamberlain, Hrdlicka, White, Williams & Aughtry

(57) ABSTRACT

An automated agent for the causal mapping of complex environments. Specifically, a disclosed method and system entails the application of statistical tools, or causality tests, to measure the strength and direction of causal relations between two or more environment components. Further, the execution of the causality tests may be an offline process that may be triggered periodically to account for changes or updates to an environment over time.

18 Claims, 8 Drawing Sheets

| | Example Environment Component List (ECL) 440 | | | |
|---|---|---|---|---|
| No. | Component | Data Resource | Data Type | |
| 1 | Daily Pre-Computation | Internal | Numerical (TS) | 442 |
| 2 | Total Pre-Computation | Internal | Numerical (TS) | 444 |
| 3 | Total Post-Computation Used | Internal | Numerical (TS) | 446 |
| 4 | Total Post-Computation Size | Internal | Numerical (TS) | 448 |
| 5 | Compression Factor | Internal | Numerical (TS) | 450 |
| 6 | Utilization | Internal | Numerical (TS) | 452 |
| 7 | DD Model | External | Categorical | 454 |
| 8 | Garbage Collection Run | External | Categorical | 456 |

*FIG. 4B*

AUTOMATED AGENT FOR THE CAUSAL MAPPING OF COMPLEX ENVIRONMENTS

BACKGROUND

While computing environments are growing more and more complex, most existing monitoring tools still fail to account for mutual dependencies across the various systems and/or components in order to pinpoint faults or problems manifesting in those computing environments.

BRIEF DESCRIPTION OF DRAWINGS

FIG. 4B shows an example environment component list in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to an automated agent for the causal mapping of complex environments. Specifically, one or more embodiments of the invention entails the application of statistical tools, or causality and/or correlation tests, to measure the strength and direction of causal relations between two or more environment components. Further, the execution of the causality and/or correlation tests may be an offline process that may be triggered periodically to account for changes or updates to an environment over time.

Figure 1:
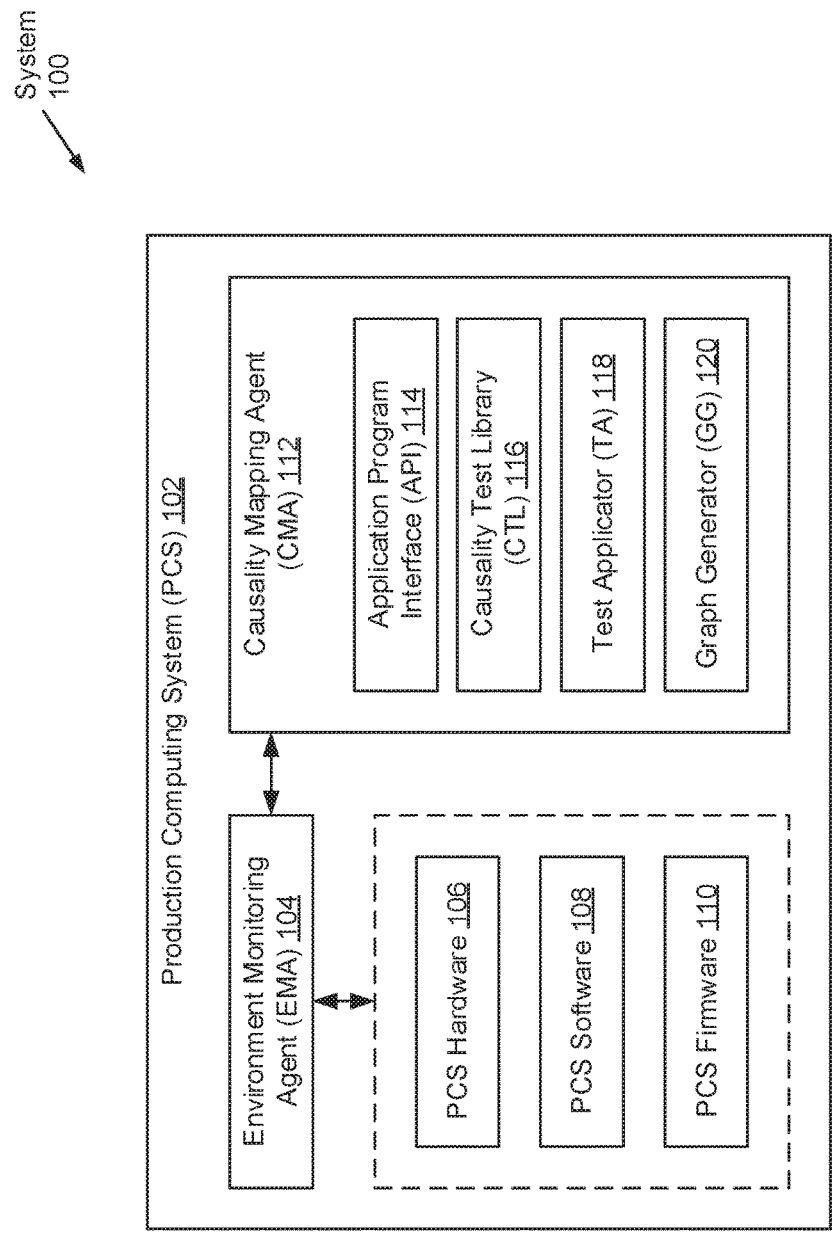
FIG. 1 shows a system in accordance with one or more embodiments of the invention.

FIG. 1 shows a system in accordance with one or more embodiments of the invention. The system (100) includes a production computing system (PCS) (102). The PCS (102) may be any computing system (see e.g., FIG. 5) used for various applications. These applications may, for example, require large-scale and complex data processing. In one embodiment of the invention, the PCS (102) may be any computing system that may service multiple users concurrently. Further, the PCS (102) may be programmed to provide and manage the allocation of computing resources (e.g., computer processors, memory, persistent and non-persistent storage, etc.) towards the execution of various processes (i.e., tasks) that may be instantiated by one or more users thereon. Examples of the PCS (102) include, but are not limited to, one or more: desktop computers, laptop computers, smartphones, tablet computers, gaming consoles, servers, mainframes, or any combination thereof.

In one embodiment of the invention, the PCS (102) may include PCS hardware (106), PCS software (108), and PCS firmware (110). Collectively, these three aforementioned components may be disclosed herein as the PCS environment (not shown). The PCS (102) may further include an environment monitoring agent (EMA) (104) and a causality mapping agent (CMA) (112). Each of these components is described below.

In one embodiment of the invention, PCS hardware (106) may refer to the various physical and/or tangible components of the PCS (102). These various physical components may be an internal component (i.e., found inside the PCS (102)), or alternatively, may be an external component (i.e., found outside, however, operatively connected to the PCS (102)). Further, PCS hardware (106) may include functionality to provide the framework and resources on which PCS software (108) and PCS firmware (110) operate. Examples of PCS hardware (106) include, but are not limited to, one or more: motherboards, central processing units (CPUs), graphics processing unit (GPU), random access memory (RAM), power supplies, video cards, storage devices (e.g., hard drives (HDDs), solid-state drives (SSDs), optical drives, etc.), audio cards, network interface cards (NICs), input peripherals (e.g., keyboards, microphones, joysticks, mice, etc.), and output peripherals (e.g., monitors, speakers, etc.).

In one embodiment of the invention, PCS software (108) may refer to the computer instructions executing, and the information residing, on the PCS (102). The computer instructions, or computer readable program code, may be executed by one or more PCS hardware (106) components (e.g., CPUs, GPUs, etc.) in order to instantiate and implement the functionalities of various computer programs and/or computer processes (i.e., instances of computer programs). Examples of these computer programs and/or processes include, but are not limited to: operating systems (OSs), user applications (i.e., that facilitate user interaction with PCS hardware (106)) (e.g., work productivity applications, educational applications, entertainment applications, simulation applications, programming applications, etc.), and utilities (e.g., disk cleaners, file managers, system monitors, screensavers, etc.). Further, the aforementioned information residing on the PCS (102) may include any computer readable data that may be generated, read, and/or manipulated by any one or more of the computer programs and/or processes executing on the PCS (102). Examples of information that may reside on the PCS (102) include, but is not limited to: raw data, programming tool libraries, documentation, and digital media (e.g., audio and/or video clips, images, etc.). In one embodiment of the invention, PCS software (108) may include the EMA (104) and the CMA (112).

In one embodiment of the invention, PCS firmware (110) may refer to special computer instructions and information embedded in one or more PCS hardware (106) components during their respective manufacturing processes. In contrast, PCS software (108) may refer to computer instructions and information on the PCS (102) that may be installed after these manufacturing processes. Specifically, the computer instructions representative of PCS firmware (110) may be computer readable program code that implements the basic functionalities of PCS hardware (106). Further, these computer instructions may serve as mediators or translators between one or more PCS hardware (106) components and PCS software (108) executing thereon. Examples of PCS firmware (110) include, but are not limited to: device drivers, basic input/output systems (BIOSs), and virtual device drivers (i.e., used in the emulation of physical hardware).

In one embodiment of the invention, the EMA (104) may be a computer program, or a computer process (i.e., an instance of a computer program), executing on the underlying hardware of the PCS (102) (i.e., the PCS hardware (106)). Specifically, the EMA (104) may be a computer program or process tasked with monitoring the PCS environment (i.e., the various components designated as PCS hardware (106), PCS software (108), or PCS firmware (110)). More specifically, the EMA (104) may include functionality to: (i) receive environment requests from the CMA (112), where each environment request may or may not include an environment context (described below) and may pertain to identifying and obtaining PCS environment components relating to the environment context, if provided; (ii) based on the environment requests, generate environment component lists (ECLs) (see e.g., FIG. 2A) specifying PCS environment components and associated metadata; and (iii) submit environment responses, including ECLs, back to the CMA (112). One of ordinary skill will appreciate that the EMA (104) may perform other functionalities without departing from the scope of the invention.

In one embodiment of the invention, the CMA (112) may be a computer program, or a computer process (i.e., an instance of a computer program), executing on the underlying hardware of the PCS (102) (i.e., the PCS hardware (106)). Specifically, the CMA (112) may be a computer program or process tasked with implementing embodiments of the invention (see e.g., FIG. 3). More specifically, the CMA (112) may include functionality to discover non-trivial causal relationships or mappings between PCS environment components. To facilitate this functionality, the CMA (112) includes an application program interface (API) (114), a causality and/or correlation test library (CTL) (116), a test applicator (TA) (118), and a graph generator (GG) (120). Each of these components is described below.

In one embodiment of the invention, the API (114) may be a hardware and/or software implemented construct. Further, the API (114) may employ a set of subroutine definitions, protocols, and/or tools for implementing a specification for the exchange of information between the CMA (112) and any other computer program or process (e.g., the EMA (104)). For example, the API (114) may establish that the exchange of information may entail a request for processing and a return of a response, if any, based on the outcome of the processing. By way of an example, the API (114) may be an inter-process communication API that facilitates information exchange through a variety of mechanisms, including, but not limited to: file transfers, signals, sockets, message queues, data pipes, shared memory, any other inter-process communication mechanism, or a combination thereof.

In one embodiment of the invention, the CTL (116) may be a data repository for storing algorithms (i.e., computer instructions or computer readable program code) for executing various causality and/or correlation tests (described below). The CTL (116) may be implemented using any type of storage unit and/or device (e.g., a filesystem, a database, a collection of tables, or any other storage mechanism). Further, the CTL (116) may be implemented using multiple storage units and/or devices, which may or may not be of the same type. In one embodiment of the invention, the CTL (116) may be implemented using persistent (i.e., non-volatile) storage media such as, for example, optical storage, magnetic storage, NAND Flash Memory, NOR Flash Memory, Magnetic Random Access Memory (M-RAM), Spin Torque RAM (ST-RAM), Phase Change Memory (PCM), or any other memory defined as a non-volatile Storage Class Memory (SCM).

In one embodiment of the invention, a causality test may refer to a procedure employed to measure causal relations between variables (e.g., two or more PCS environment components). In the simplest case, a causal relation between two variables exists if the presence of (or an action induced by) the first variable affects the presence of (or an action induced by) the second variable. Further, in one embodiment of the invention, a correlation test may refer to a procedure employed to measure whether there exists, and the strength of, relationships, causal or not, between variables (e.g., two or more PCS environment components). Examples of causality and/or correlation tests for which algorithms may be stored in the CTL (116) include, but are not limited to: the Granger causality test, the Pearson correlation test, the Kendall correlation test, and the Spearman correlation test.

In one embodiment of the invention, the TA (118) may be a computer process (i.e., an instance of a computer program) executing on the underlying hardware of the PCS (102) (i.e., PCS hardware (106)). Specifically, the TA (118) may be a computer process tasked with the application of one or more causality and/or correlation tests (described above) in accordance with one or more embodiments of the invention. More specifically, the TA (118) may include functionality to: (i) obtain environment component lists (ECLs) from the EMA (104) through the API (114); (ii) select one or more causality and/or correlation tests to apply; (iii) retrieve the respective algorithm(s) for the selected causality and/or correlation test(s) from the CTL (116); (iv) execute the retrieved algorithm(s) using the ECLs as inputs; (v) obtain scaled causality results (SCRs) (described below) based on the executed algorithm(s) onto the ECLs; and (vi) share the SCRs with the GG (120).

In one embodiment of the invention, the GG (120) may be a computer process (i.e., an instance of a computer program)

executing on the underlying hardware of the PCS (102) (i.e., PCS hardware (106)). Specifically, the GG (120) may be a computer process tasked with the presentation of information resulting from the execution of one or more causality and/or correlation tests in accordance with one or more embodiments of the invention. More specifically, the GG (120) may include functionality to: (i) obtain scaled causality results (SCRs) from the TA (118); and (ii) present the SCRs to one or more users of the PCS (102). By way of an example, the GG (120) may present SCRs through causal or causality graphs (see e.g., FIG. 2B). One of ordinary skill will appreciate that the GG (120) may present information to users through other representations of data, which may or may not be graphical.

While FIG. 1 shows a configuration of components, other system configurations may be used without departing from the scope of the invention.

Figure 2A:
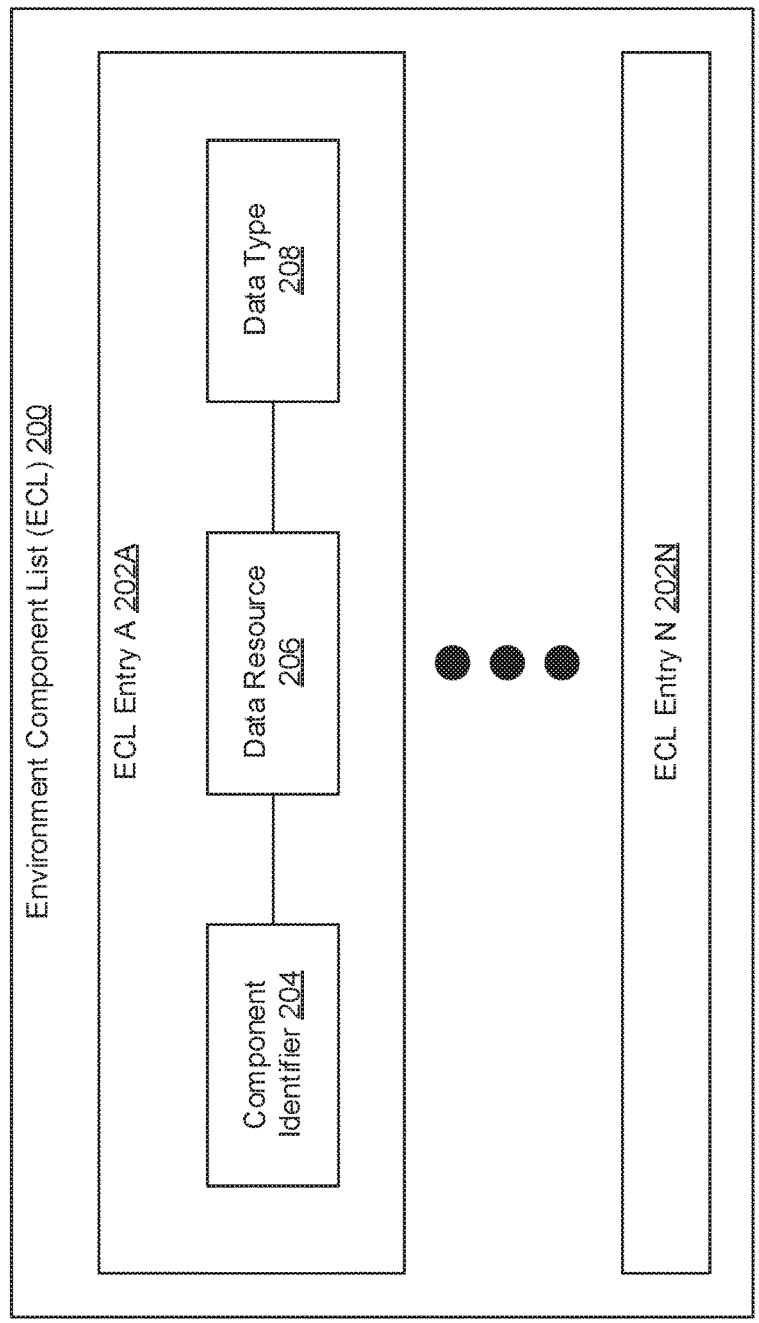
FIG. 2A shows an environment component list in accordance with one or more embodiments of the invention.

FIG. 2A shows an environment component list (ECL) in accordance with one or more embodiments of the invention. The ECL (200) may be a data object or data structure for storing information pertaining to two or more PCS environment components (i.e., one or more PCS hardware, PCS software, and/or PCS firmware components (described above)). Further, as mentioned above, an ECL (200) may be generated by the environment monitoring agent (EMA) (see e.g., FIG. 1) based on environment requests submitted by the causality mapping agent (CMA). Subsequently, the CMA may execute causality and/or correlation test(s) using the ECL (200) to measure causal relations between the various PCS environment components for which associated information may be specified in the ECL (200).

In one embodiment of the invention, the ECL (200) may include two or more ECL entries (202A-202N). Each ECL entry (202A-202N) includes pertinent information relating to the nature of one PCS environment component. Specifically, each ECL entry (202A-202N) may include a component identifier (204), a data resource (206), and a data type (208) associated with the PCS environment component to which the ECL entry (202A-202N) pertains. Each of these data items is described below.

In one embodiment of the invention, the component identifier (204) may be a string of characters (e.g., letters, numbers, symbols, etc.) that may be used to uniquely identify the PCS environment component. The component identifier (204) may be a string of characters generated, and assigned to the PCS environment component, by the computing system (e.g., the PCS (see e.g., FIG. 1)). Alternatively, the component identifier (204) may be a string of characters generated, and assigned to the PCS environment component, by one or more users of the computing system. Further, the component identifier (204) may entail any number and/or combination of characters. By way of an example, the component identifier (204) may be represented through an alphanumeric tag, such as "component123_id."

In one embodiment of the invention, the data resource (206) may refer to the physical and/or virtual computer resource with which the PCS environment component is associated. Dependencies between environment components originating from the same data resource (206), versus different data resources (206), may be used as a measure towards determining causality and/or correlation. Examples of the data resource (206) include, but are not limited to: internal databases, external databases, monitoring tools—e.g., the EMA—installed on the environment, log generators, log accumulators, and hardware and/or virtual sensors.

In one embodiment of the invention, the data type (208) may refer to the classification associated with the PCS environment component. The data type (208) of an environment component may be essential towards identifying the appropriate causality and/or correlation test(s) to perform. Examples of the data type (208) include, but are not limited to, the following classifications: static, dynamic, continuous, discrete, time-series, numerical, categorical, ordinal, nominal, etc.

While FIG. 2A shows a configuration of components, other data items or information may be stored in each ECL entry (202A-202N) without departing from the scope of the invention.

Figure 2B:
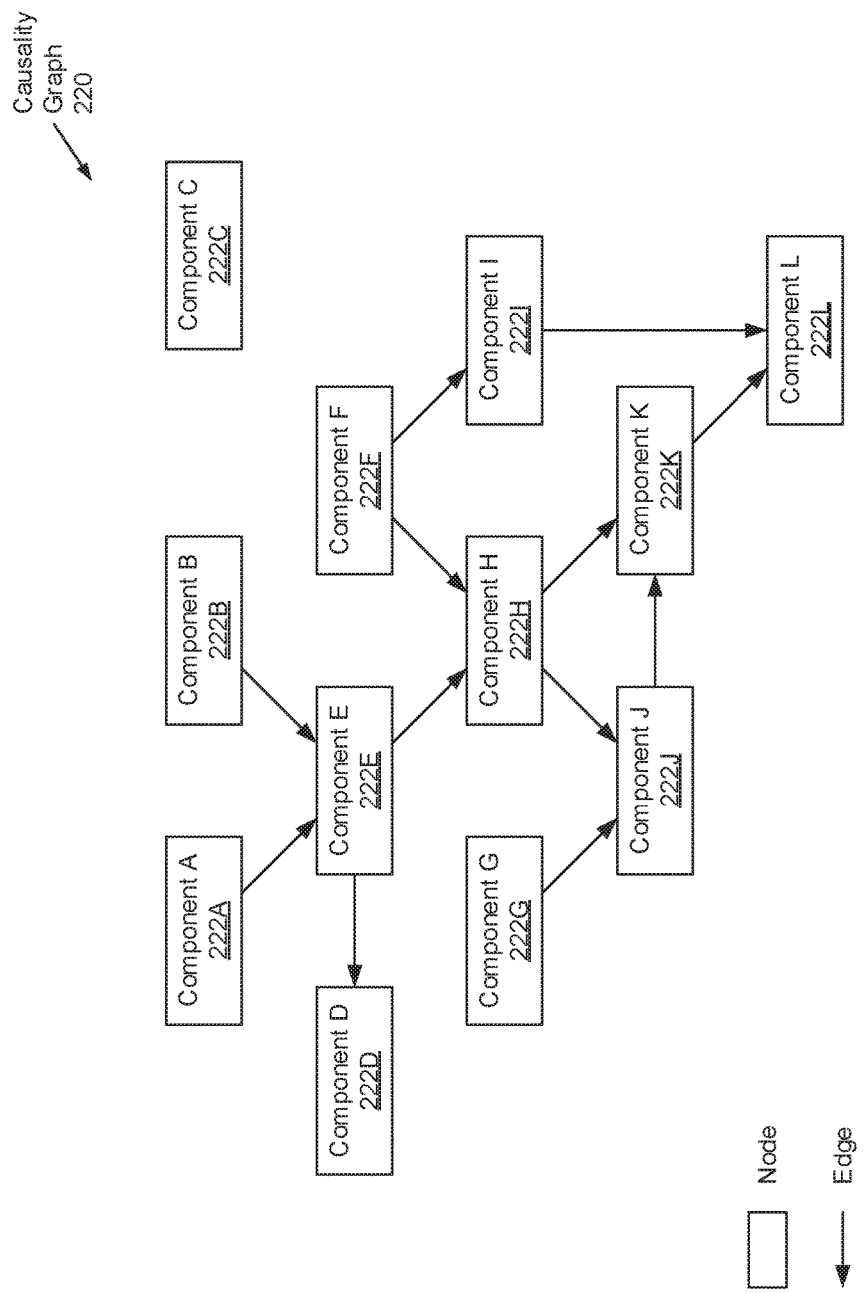
FIG. 2B shows a causality graph in accordance with one or more embodiments of the invention.

FIG. 2B shows a causality graph in accordance with one or more embodiments of the invention. A causality graph (220) may be a diagram representing a system of connections (i.e., causal relations) between two or more variables (e.g., PCS environment components). Specifically, a causality graph (220) may be presented as a directed graph, or as a set of nodes (or vertices) that may or may not be connected to one another through edges, where each edge may be associated with a direction. In one embodiment of the invention, a node or vertex (e.g., Component H (222H)) may represent a PCS environment component (see e.g., FIG. 1), whereas an edge may represent a causal relation between two PCS environment components, if any. Further, the direction associated with an edge between a source node and a target node may imply that the source node may be the cause of an effect exhibited by the target node. For example, in the portrayed causality graph (220), the edge between Component A (222A) (i.e., the source node) and Component E (222E) (i.e., the target node) may imply that a causal relation exists between Component A (222A) and Component E (222E), where Component A (222A) may be a cause for an effect exhibited by or in Component E (222E).

In one embodiment of the invention, each edge in a causality graph (220) may further be associated with a value and/or color (not shown). The value and/or color may denote the strength of the casual relation between the corresponding source and target nodes. Further, a discrete scale may be employed to classify each edge or to assign a color to each edge based on where the value associated with an edge normalizes or maps along the discrete scale. By way of an example, the discrete scale may be bounded by two extremes (e.g., [1, 4]) where mutually exclusive segments or ranges (e.g., [1, 1.99], [2, 2.99], [3, 3.99], and [4]) within the two extremes pertain to a causal relation classification (e.g., no apparent relation, weak, strong, and potentially casual), respectively. In one embodiment of the invention, if the value associated with a causal relation between a source node and a target node is classified under the "no apparent relation" classification, an edge may not be presented (see e.g., Component C (222C)) for the causal relation in the causality graph (220). In one embodiment of the invention, the strength and direction of a casual relation, if any, between a source node and a target node may be determined through the execution of a causality and/or correlation test (see e.g., FIG. 3) using an ECL (see e.g., FIG. 2A) as input.

Figure 3:
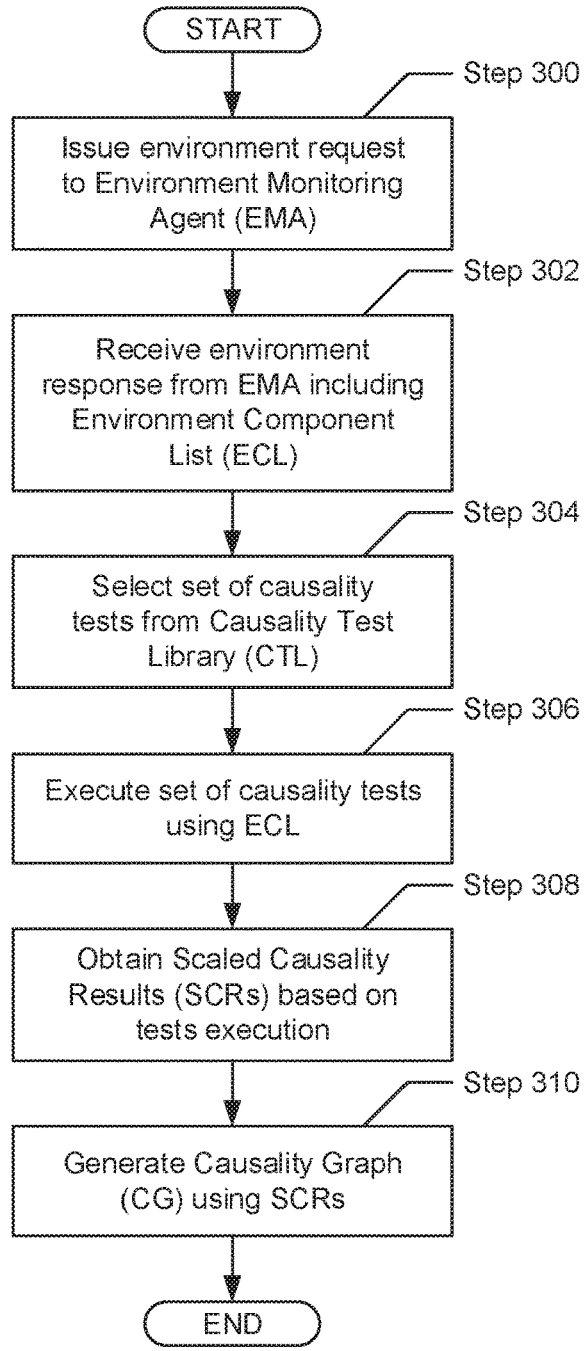
FIG. 3 shows a flowchart describing a method for generating a causality graph in accordance with one or more embodiments of the invention.

FIG. 3 shows a flowchart describing a method for generating a causality graph in accordance with one or more embodiments of the invention. While the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, an environment request is issued to the environment monitoring agent (EMA) (see e.g., FIG. 1). In one embodiment of the invention, the environment request may include an environment context. The environment context may refer to information relevant to, and that may guide the processing of, the environment request. For example, during an investigation of an anomaly within the computing system (e.g., the PCS), the environment context may specify one or more sub-systems whereon the anomaly has manifested. Subsequently, the EMA may use the enclosed environment context to narrow the generated environment component list (ECL) to two or more PCS environment components associated or operatively connected to the specified sub-system(s).

In Step 302, an environment response is received from the EMA. In one embodiment of the invention, the environment response may include an ECL (see e.g., FIG. 2A). As described above, the ECL may be a data object or structure that stores information regarding two or more PCS environment components, where at least a portion of the information (e.g., the data resource and the data type) is pertinent to measuring causality between the specified PCS environment components. Further, the PCS environment components specified in the ECL may have been identified based on the environment context (described above) submitted with the corresponding environment request.

In Step 304, a set of one or more causality and/or correlation tests is selected. In one embodiment of the invention, the set of causality and/or correlation tests may be selected based on preset testing schedule configured by one or more users of the production computing system (PCS) (i.e., the computing system on which the PCS environment components, specified in the ECL, reside). In one embodiment of the invention, the preset testing schedule may also specify a periodicity for the re-execution of the causality and/or correlation tests as the PCS environment changes or updates over time. Moreover, the selected set of causality and/or correlation tests, or more specifically, computer readable program code for implementing the selected set of causality and/or correlation tests, may be retrieved from the causality and/or correlation test library (CTL) (see e.g., FIG. 1).

In Step 306, the set of causality and/or correlation tests (selected in Step 304) is executed. Specifically, in one embodiment of the invention, computer readable program code for implementing the selected set of causality and/or correlation tests may be executed. Further, each of the causality and/or correlation tests may be applied to, or may be implemented using, at least a portion of the ECL (e.g., the data resource and the data type) (obtained in Step 302). In one embodiment of the invention, each causality and/or correlation test may be performed sequentially. In another embodiment of the invention, one or more causality and/or correlation tests may be performed in parallel.

In Step 308, a set of one or more scaled causality results (SCRs) is obtained. Specifically, one SCR may be obtained for each causality and/or correlation test (conducted in Step 306). In one embodiment of the invention, a SCR may be represented as a causality matrix, or a symmetric table of values showing the strength and direction of the causal relations between the tested variables (i.e., the two or more PCS environment components specified in the ECL). Specifically, the causality matrix of n variables $X_1, \ldots, X_n$ is the n×n matrix whose i,j entry is causality(Xi, Xj). Further, the strength of a causal relation (i.e., each i,j entry) between two variables may be represented through the magnitude of the value shown—i.e., |causality(Xi, Xj)|—whereas the direction of the causal relation, specifying which variable may be the cause and which may be the effect, may be represented through the sign of the value shown—i.e., sgn(causality(Xi, Xj)). In one embodiment of the invention, values shown as zero may also be exhibited as one or more entries in the causality matrix. In such an embodiment, the zero values may denote that no apparent relation, causal or otherwise, is present between the two variables for which the value or entry is associated. Moreover, in one embodiment of the invention, in embodiments where a value or entry is non-zero, causal relation strength may be measured based on a discrete scale, where various incrementing discrete values along the scale designate a causal relation as, for example, one of four strength states: (1) no apparent relation; (2) weak; (3) strong; and (4) potentially causal.

In Step 310, a set of one or more causality graphs (see e.g., FIG. 2B) is generated. Specifically, one causality graph may be generated for each causality and/or correlation test (conducted in Step 306). As defined above, in one embodiment of the invention, a causality graph may be a diagram representing a system of connections (i.e., causal relations) between two or more variables (e.g., the PCS environment components specified in the ECL obtained in Step 302). Further, each causality graph may be generated using one of the one or more SCRs (obtained in Step 308). In one embodiment of the invention, based on the generated causality graph(s), one or more users of the computing system (e.g., PCS) may perform root code analysis (RCA)—a problem solving method directed to identifying root causes of faults or problems (i.e., anomalies detected/discovered on the computing system). In another embodiment of the invention, based on the generated causality graph(s), one or more users of the computing system may perform environment optimization, thereby improving overall computing system performance.

Figure 4A:
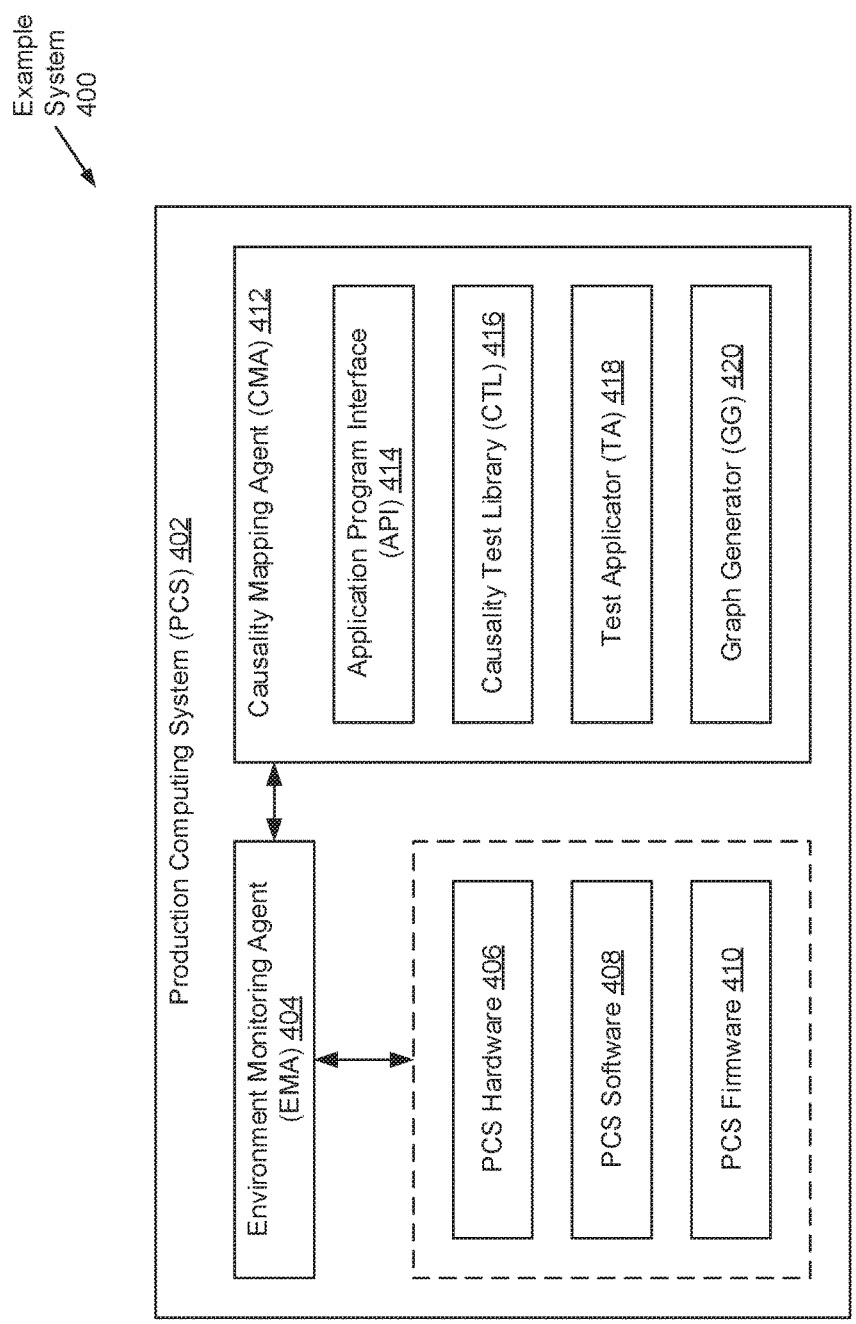
FIG. 4A shows an example system in accordance with one or more embodiments of the invention.
Figure 4C:
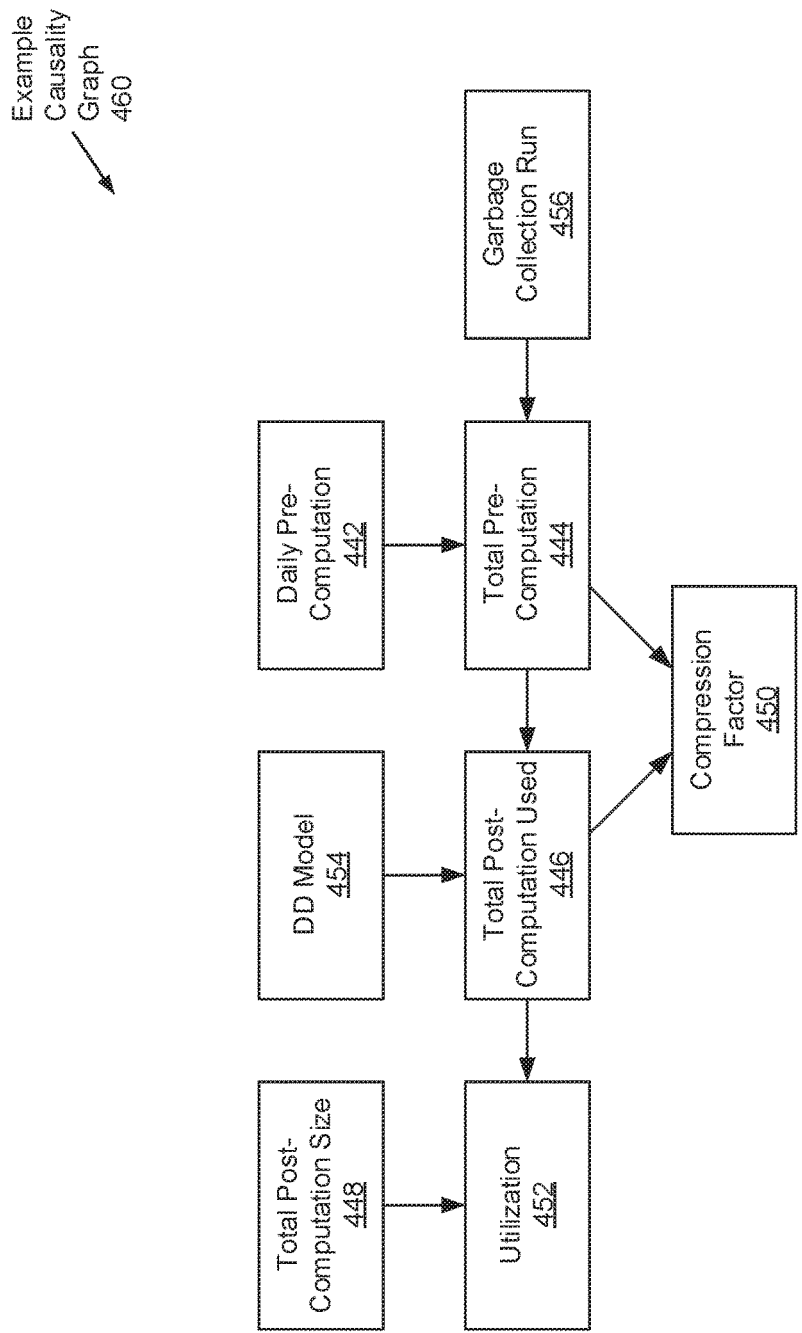
FIG. 4C shows an example causality graph in accordance with one or more embodiments of the invention.

FIGS. 4A-4C show various aspects of an example in accordance with one or more embodiments of the invention. The following example, presented in conjunction with components shown in FIGS. 4A-4C, is for explanatory purposes only and not intended to limit the scope of the invention.

Turning to FIG. 4A, FIG. 4A shows an example system in accordance with one or more embodiments of the invention. The example system (400) includes a production computing system (PCS) (402). The PCS (402) includes an environment monitoring agent (EMA) (404) tasked with monitoring or tracking multiple PCS environment components. Each PCS environment component may be a component of the PCS hardware (406), a component of the PCS software (408), or a component of the PCS firmware (410). The PCS (402) further includes a causality mapping agent (CMA) (412) operatively connected to the EMA (404) and tasked with implementing embodiments of the invention (see e.g., FIG. 3). Lastly, the CMA (412) includes an application program interface (API) (414), a causality and/or correlation test library (CTL) (416), a test applicator (TA) (418), and a graph generator (GG) (420).

Turning to the example, consider a scenario whereby an anomaly has manifested in a sub-system (not shown) of the PCS (402) responsible, at least in part, for the implementation of data deduplication (DD) operations in the PCS (402). Accordingly, a user of the PCS (402) may activate the CMA (412) as an initial step for performing a root cause analysis (RCA) of the anomaly.

Upon activation, the CMA (412), or more specifically, the API (414) of the CMA (412), issues an environment request to the EMA (404). The environment request specifies the above-mentioned sub-system (responsible for, at least in part, implementing DD operations) as the environment context. In receiving the environment request from the CMA (412), the EMA (404) generates an environment component list (ECL) (see e.g., FIG. 4B) based on the environment context enclosed with the environment request.

Turning briefly to FIG. 4B, FIG. 4B shows an example ECL in accordance with one or more embodiments of the invention. The example ECL (440) includes multiple ECL entries (442, 444, 446, 448, 450, 452, 454, 456), where each ECL entry (442, 444, 446, 448, 450, 452, 454, 456) may disclose information relating to a PCS (402) environment component found by the EMA (404) to be relevant to the environment context (i.e., DD operations). Further, the information disclosed in each ECL entry (442, 444, 446, 448, 450, 452, 454, 456) specifies the ECL component, the data resource associated with the ECL component, and the data type associated with the ECL component.

Proceeding with the example, after generating the ECL, the EMA (404) issues an environment response back to the CMA (412), where the environment response includes the ECL. Thereafter, in receiving the environment response, the API (414) extracts the ECL enclosed therein, and presents the ECL to the TA (418). Subsequently, the TA (418) selects one or more causality and/or correlation tests to perform. For the purposes of this example, assume selection of the causality and/or correlation test(s) is based on a set of instructions provided to the CMA (412) by the above-mentioned user of the PCS (402). Following selection of which causality and/or correlation test(s) to perform, the TA (418) accesses the CTL (416) to retrieve computer readable program code associated with the selected causality and/or correlation test(s). Next, the TA (418) implements each of the causality and/or correlation test(s) using at least a portion of the ECL (e.g., the data resource and data type information disclosed in each ECL entry) as input through execution of the retrieved computer readable program code.

Afterwards, the TA (418) obtains one or more scaled causality and/or correlation results (SCRs) based on the conducting of the causality and/or correlation test(s). Each SCR is an output produced by one of the selected causality and/or correlation test(s), and further, shows the strength and direction of the causal relations between the various PCS (402) environment components specified in the ECL based on the methodology of the selected causality and/or correlation test. In obtaining the SCR(s), the TA (418) presents the SCR(s) to the GG (420). Based on the SCR(s), the GG (420) subsequently generates one or more causality graphs (see e.g., FIG. 4C).

Turning briefly to FIG. 4C, FIG. 4C shows an example causality graph in accordance with one or more embodiments of the invention. The example causality graph (460) illustrates each of the PCS (402) environment components (specified in the ECL (see e.g., FIG. 4B)) as a node/vertex. Further, between each pair of nodes/vertices, a directed edge is portrayed representing the causal relation between the source node and target node of the pair.

Proceeding with the example, after generating the causality graph(s), the CMA (412) presents the causality graph(s) to the user of the PCS (402). Thereafter, the user pursues an RCA of the above-mentioned manifested anomaly based, at least in part, on the causality graph(s) presented by the CMA (412).

Figure 5:
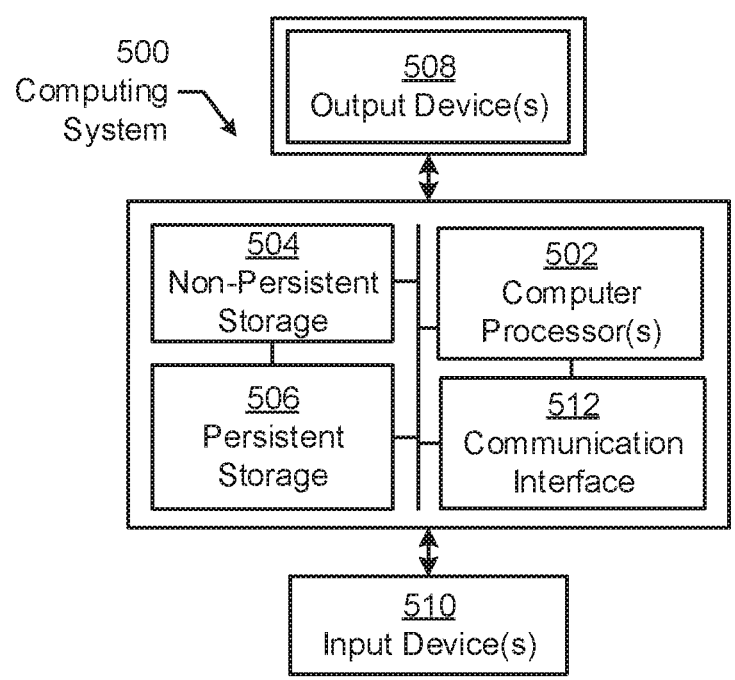
FIG. 5 shows a computing system in accordance with one or more embodiments of the invention.

FIG. 5 shows a computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for mapping causality in computing systems, comprising:
   obtaining an environment component list (ECL) comprising a plurality of entries for a plurality of environment components;
   selecting at least one causality test;
   conducting the at least one causality test using the ECL; and
   obtaining at least one scaled causality result (SCR) based on conducting the at least one causality test,
   wherein the at least one SCR comprises a symmetric matrix comprising values denoting a strength and a direction for causal relations between pairs of environment components of the plurality of environment components.

2. The method of claim 1, wherein each entry of the plurality of entries specifies a data resource and a data type associated with an environment component of the plurality of environment components.

3. The method of claim 2, wherein each environment component of the plurality of environment components is one selected from a group consisting of a hardware component in a computing system, a software component in the computing system, and a firmware component in the computing system.

4. The method of claim 1, further comprising:
generating at least one causality graph based on the at least one SCR.

5. The method of claim 1, further comprising:
prior to obtaining the ECL:
    issuing an environment request to an environment monitoring agent (EMA); and
    receiving, from the EMA, an environment response comprising the ECL.

6. The method of claim 5, wherein the environment request comprises an environment context, wherein the ECL is generated based on the environment context.

7. A computing system, comprising:
a computer processor;
a causality test library (CTL) storing computer readable program code for implementing a set of causality tests; and
a test applicator (TA) executing on the computer processor and operatively connected to the CTL,
wherein the TA is programmed to:
    obtain an environment component list (ECL) comprising a plurality of entries for a plurality of environment components;
    select at least one causality test;
    based on the selecting, retrieve computer readable program code associated with the at least one causality test;
    conduct the at least one causality test, by executing the computer readable program code associated with the at least one causality test, using the ECL; and
    obtain at least one scaled causality result (SCR) based on conducting the at least one causality test,
    wherein the at least one SCR comprises a symmetric matrix comprising values denoting a strength and a direction for causal relations between pairs of environment components of the plurality of environment components.

8. The computing system of claim 7, further comprising:
a graph generator (GG) executing on the computer processor and operatively connected to the TA, and programmed to:
obtain the at least one SCR from the TA; and
generate at least one causality graph based on the at least one SCR.

9. The computing system of claim 7, further comprising:
an application program interface (API) executing on the computer processor and operatively connected to the TA; and
an environment monitoring agent (EMA) executing on the computer processor and operatively connected to the API,
wherein the API is programmed to:
    issue an environment request to the EMA;
    receive, from the EMA, an environment response comprising the ECL; and
    provide the ECL to the TA.

10. The computing system of claim 9, further comprising:
a set of environment components tracked by the EMA,
wherein the ECL specifies information associated with a subset of the set of environment components.

11. The computing system of claim 10, wherein each environment component in the set of environment components is one selected from a group consisting of a hardware component of the computing system, a software component of the computing system, and a firmware component of the computing system.

12. The computing system of claim 7, further comprising:
a causality mapping agent (CMA) executing on the computer processor and comprising at least the CTL and the TA.

13. A non-transitory computer readable medium (CRM) comprising computer readable program code, which when executed by a computer processor, enables the computer processor to:
    obtain an environment component list (ECL) comprising a plurality of entries for a plurality of environment components;
    select at least one causality test;
    conduct the at least one causality test using the ECL; and
    obtain at least one scaled causality result (SCR) based on conducting the at least one causality test,
    wherein the at least one SCR comprises a symmetric matrix comprising values denoting a strength and a direction for causal relations between pairs of environment components of the plurality of environment components.

14. The non-transitory CRM of claim 13, wherein each entry of the plurality of entries specifies a data resource and a data type associated with an environment component of the plurality of environment components.

15. The non-transitory CRM of claim 14, wherein each environment component of the plurality of environment components is one selected from a group consisting of a hardware component in a computing system, a software component in the computing system, and a firmware component in the computing system.

16. The non-transitory CRM of claim 13, further comprising computer readable program code, which when executed by the computer processor, enables the computer processor to:
    generate at least one causality graph based on the at least one SCR.

17. The non-transitory CRM of claim 13, further comprising computer readable program code, which when executed by the computer processor, enables the computer processor to:
    prior to obtaining the ECL:
        issue an environment request to an environment monitoring agent (EMA); and
        receive, from the EMA, an environment response comprising the ECL.

18. The non-transitory CRM of claim 17, wherein the environment request comprises an environment context, wherein the ECL is generated based on the environment context.

* * * * *